Oct. 4, 1938. J. M. RUSNAK ET AL 2,131,973
WORK POSITIONING MEANS
Filed April 8, 1936 3 Sheets-Sheet 2

INVENTORS
J.M. RUSNAK
and
G.H. HOCHMUTH
BY Joseph K. Schofield
ATTORNEY

Oct. 4, 1938.　　J. M. RUSNAK ET AL　　2,131,973
WORK POSITIONING MEANS
Filed April 8, 1936　　3 Sheets-Sheet 3
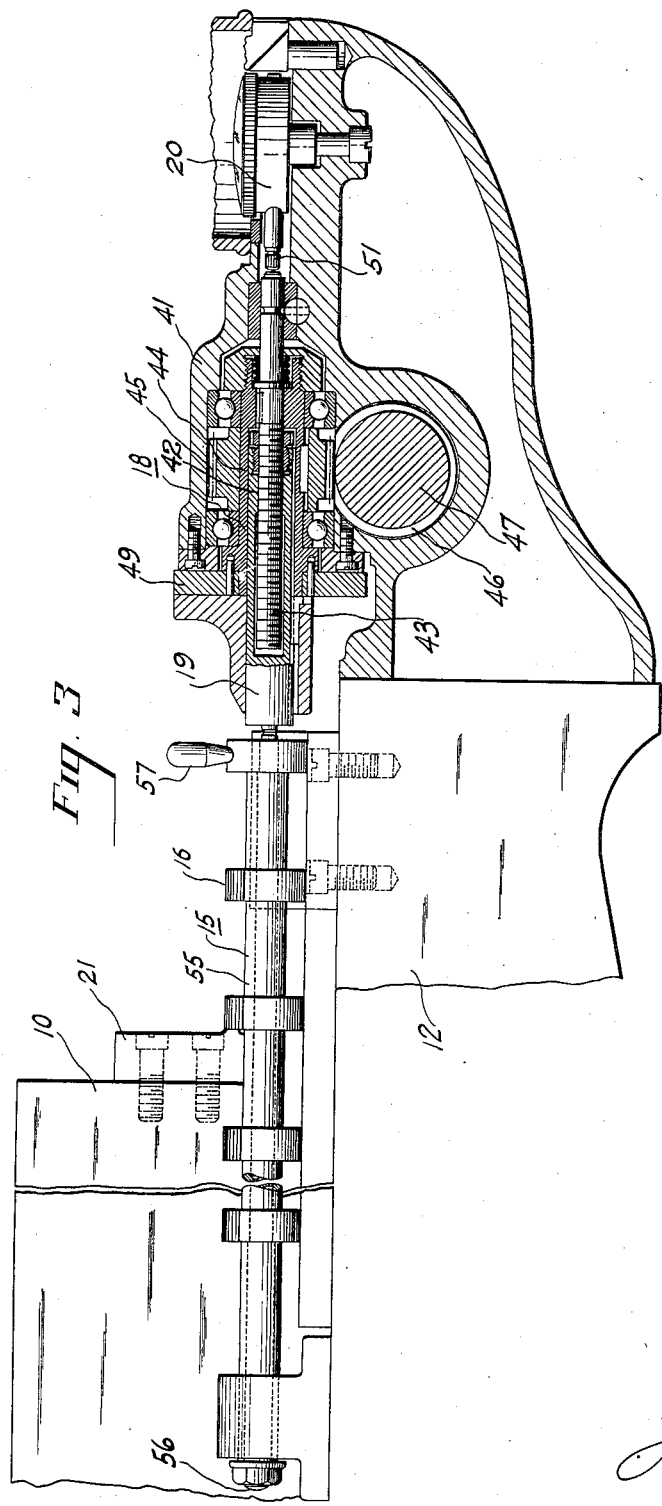
INVENTORS
J. M. RUSNAK
and
G. H. HOCHMUTH
BY Joseph K. Schofield
ATTORNEY Patented Oct. 4, 1938

2,131,973

UNITED STATES PATENT OFFICE 2,131,973

WORK POSITIONING MEANS

John M. Rusnak and George H. Hochmuth, West Hartford, Conn., assignors, by mesne assignments, to Niles-Bement-Pond Company, New York, N. Y., a corporation of New Jersey Application April 8, 1936, Serial No. 73,334

4 Claims. (Cl. 77—63)

This invention relates to machine tools and more particularly to improved means to accurately determine the position of a work supporting table movable on a machine tool relative to a fixed part of the machine. Primarily the present invention relates to an improvement in work positioning means similar to those described and claimed in the patent to Hanson 1,323,267 granted December 2, 1919.

A primary object of the invention is to provide complete and permanently mounted position-determining equipment on the machine tool enabling extremely accurate adjustments to be made of the table positions without the necessity of removing and replacing separable parts such as measuring rods, micrometers, etc.

Another object of the invention is to provide an elongated measuring bar or rod having a number of fixed spaced-apart projections thereon, the bar being oscillatable about its axis to positions to engage an abutment on the movable table with any of its projections or oscillatable to a position enabling the abutment to pass the projections when the table is being adjusted to new positions.

It is another object of the invention to provide a measuring bar or rod mounted in a machine tool and adapted for movement axially a limited distance during the positioning operation, the bar being adapted to be oscillated about its axis to and from a measuring position to permit movement of the table over relatively long distances between adjustments to new positions.

A still further object of the invention is to permanently house a micrometer within the base of the machine adjacent one end of the measuring bar or rod and to provide means to axially adjust the position of a micrometer anvil to contact with and actuate the pointer of a dial indicator, or other indicating means, to determine when the table has been moved precisely to a predetermined adjusted position.

With the above and other objects in view, our invention may include the following features of construction and operation set forth in the accompanying specification and drawings.

In the accompanying drawings annexed hereto and forming a part of this specification, we have shown our invention embodied in a jig boring machine of the type shown in the above-referred to patent to Hanson, but it will be understood that the invention can be otherwise embodied and that the drawings are not to be construed as defining or limiting the scope of the invention, the claims appended to this specification being relied upon for that purpose.

In the drawings:

Fig. 3 is a cross sectional view of the positioning device taken upon the plane of line 3—3 of Fig. 2.

Figure 1:
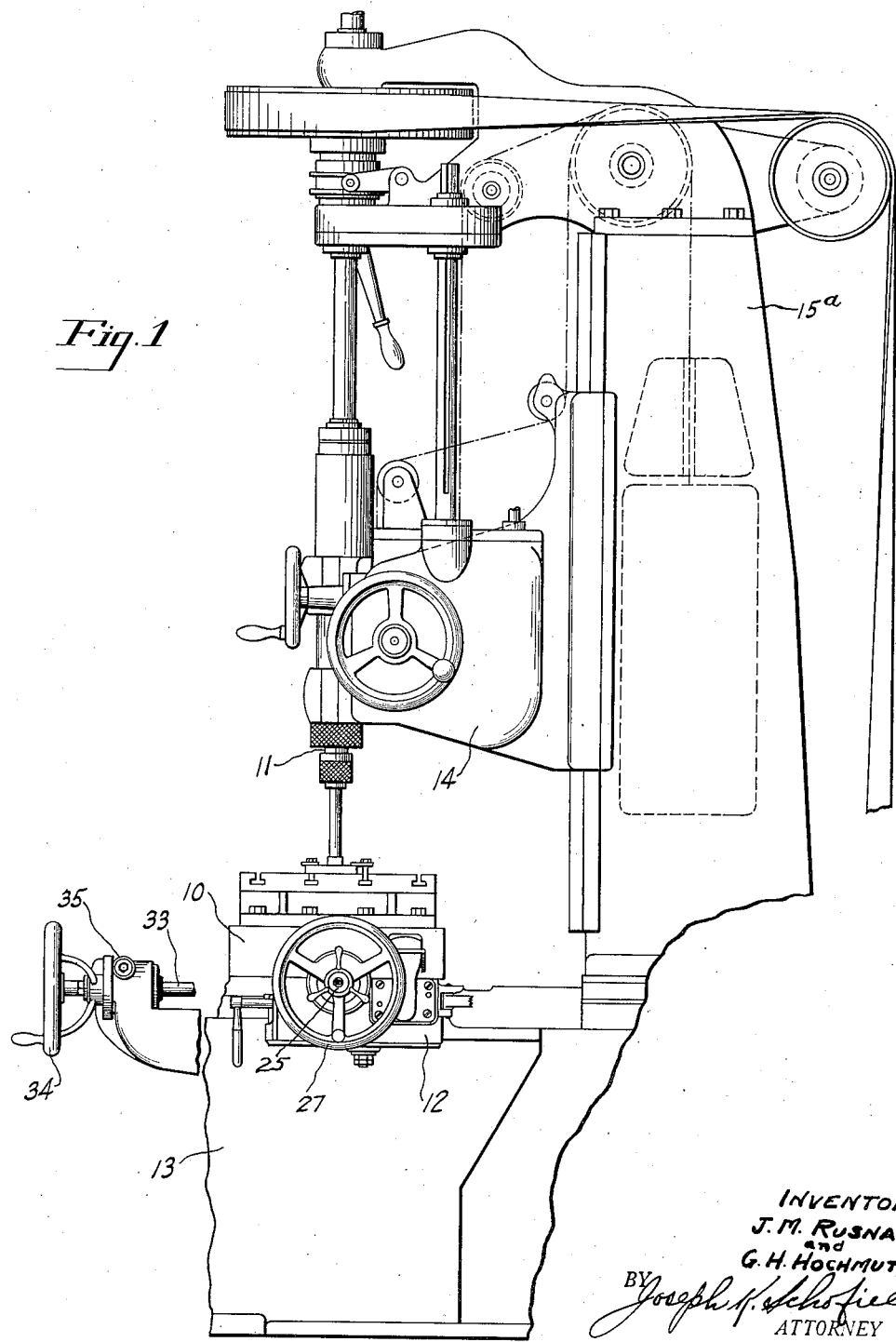
Figure 1 is a side elevation of a complete machine provided with the present invention.

In the above-mentioned drawings we have shown but one embodiment of the invention which is now deemed preferable, but it is to be understood that changes and modifications may be made within the scope of the appended claims without departing from the spirit of the invention.

Briefly it may be stated that our invention is adapted to be associated with and is shown applied to a machine tool of the vertical spindle milling or boring type, the work supporting table 10 of which is adjustable to different positions in a plane normal to the axis of the tool rotating and feeding spindle 11. A saddle 12 is movable in one direction upon the machine base 13 and the work supporting table 10 is movable upon the saddle 12 in a direction normal to the direction of movement of the saddle. The tool spindle 11 may be supported in a head 14 slidable vertically on ways provided on a column 15a. As the rotating and feeding means for the spindle 11 and for moving the head 14 form no part of the present invention, further description is not thought necessary.

Precision measuring devices to be more fully described hereafter are provided to determine the distances moved by the table 10 on the saddle 12 and by the saddle 12 on the base 13. As these measuring means are similar to each other in every way, one only of them will be described.

A bar or rod 15 having spaced projections 16 fixed or formed thereon, presently to be more fully described, is adapted to be placed in a suitable groove 17 in the base 13 or saddle 12 disposed in a direction parallel to the direction of movement of the table or saddle. A micrometer 18 is mounted in the base 13 and saddle 12 so that an end of this bar or rod may contact with the end or anvil 42 of the micrometer spindle 19. A dial indicator 20 is mounted adjacent each micrometer 18 and contacts with a micrometer spindle 19 at one end. Upon movement of the table 10 or saddle 12 limited distances a fixed abutment 21 on an end face thereof may engage against one of the projections 16 respectively on the rods or bars 15 and force the bar engaged axially against its micrometer spindle 19. The spindle 19 in turn will be axially moved to vary the position of the pointer 52 of its dial indicator 20. Each of the projections 16 on the bars or rods 15 has a cut away portion 22 at one portion so that the bars 15 when oscillated about their axes will permit an abutment 21 on the table 10 or saddle 12 to pass any of the projections 16 and, by oscillating the rods 15 to another or operative position, the abutment 21 will engage an end surface of any desired projection.

Figure 2:
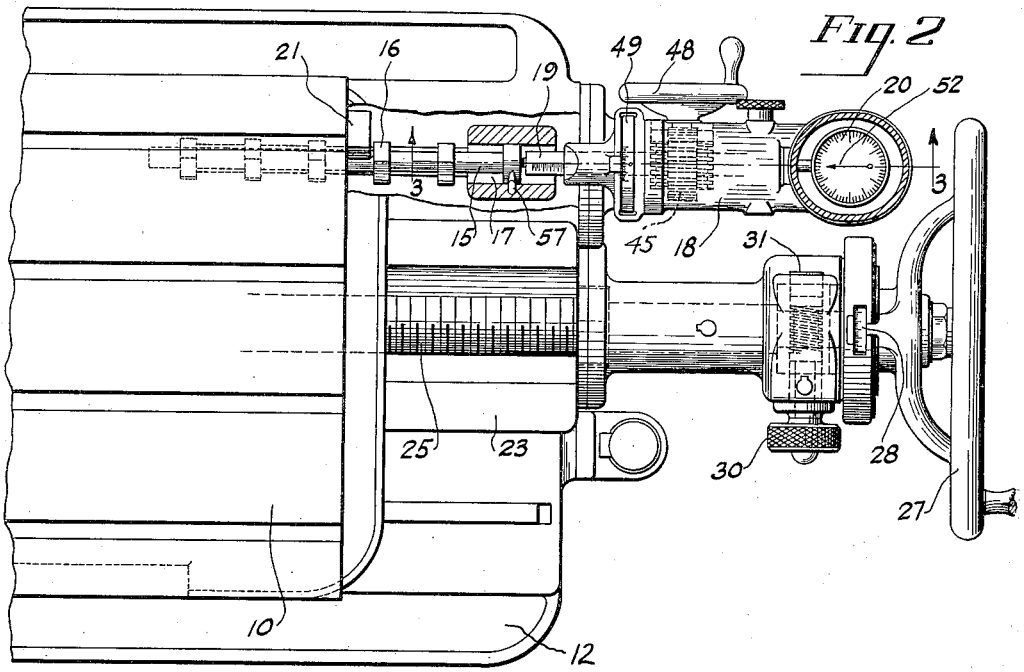
Fig. 2 is a fragmentary plan view of a section of the saddle and work supporting table forming part of a machine tool to which the invention is applied.

A plan view of the improved measuring or positioning mechanism is shown in Fig. 2 of the drawings in which the saddle 12, a part only of which is shown, is indicated as having ways 23 along which the table 10 may be slidably adjusted. In order to move the table 10 laterally along this saddle 12 a screw 25 is provided disposed within the saddle 12 and engaging a nut 26 depending from the lower surface of the table 10. At one end of the screw 25 is a hand wheel 27 directly keyed thereto whereby rotation of the screw 25 may be effected to move the table 10 to the right or left as shown in Fig. 2. By means of a graduated dial 28 on this screw 25 positions may be approximately determined by reference to a zero line on the housing or bracket within which the screw 25 is mounted. Preferably also there is a slow motion device for rotating the screw 25 having a knob 30 on a short transverse shaft 31 at its outer end. By rotating the knob, extremely fine adjustments of the table movement may be effected. This slow motion device may be of any type and forms no part of the present invention. By rotating the hand wheel 27 movements over longer distances may be easily effected at relatively high speed. It will be understood that there will be a screw 33 rotatably mounted in the base 13 corresponding to the above described screw 25 in the saddle 12 so that the saddle 12 may be adjusted on the base 13. By rotation of this latter screw 33 the saddle 12 may be moved forward and backward on the base 13 in a direction at right angles to the movement of the table 10 on the saddle 12. As shown in Fig. 1 of the drawings, this screw 33 may have a hand wheel 34 and slow motion device 35 similar to the first described screw.

In order to determine adjustments of the table 10 on the saddle 12 to an extremely high precision, there is mounted a micrometer 18 preferably laterally adjacent the end of the screw 25 above referred to, this micrometer 18 and its associated parts being more clearly indicated in section in Fig. 3. As shown in section in this figure, the micrometer 18 is enclosed within a housing 41 secured directly to the saddle 12 and has an anvil 42 movable axially by means of a screw 43. The anvil 42 is splined to its casing as usual in micrometers of this type to prevent rotative motion but to permit axial adjustment. The micrometer screw 43 is rotatable by means presently to be described so that this micrometer anvil 42 may be adjusted axially to any position. In order to rotate the screw 43 to effect axial movements of this anvil 42, the micrometer 18 is provided with a sleeve 44 closely surrounding the anvil 42 and keyed to the screw 43. The sleeve 44 is rotatably mounted within suitable antifriction bearings and has a helical gear 45 secured on its outer surface. By means of a mating helical gear 46 engaging the gear 45 and mounted on a transverse shaft 47 having a hand wheel 48 at its outer end the anvil 42 may be adjusted to any position. A graduated dial 49 secured fixedly to the sleeve 44 so that it will rotate with the sleeve and micrometer screw 43 enables the position of the anvil 42 axially within the micrometer frame or body member 18 to be determined.

In order to determine the precise adjustment of the table after the micrometer 18 has been adjusted and the table 10 moved up into position with the abutment 21 against one of the projections 16 to be more fully described hereinafter, the dial indicator 20 is provided, the movable spindle 51 of which abuts against the extended end of the micrometer screw 43. This part of the mechanism operates in every way similar to that shown in the above referred to patent to Hanson but is mounted so that the bar 15, the anvil 42 of the micrometer 40 and the spindle 51 of the indicator 20 are all in the same line. Pressure of the abutment 21 on table 10 presses the bar 15 toward and in contact with the micrometer anvil 42 which in turn presses against the dial indicator spindle 51. The table 10 is moved therefore for any adjustment until the pointer 52 of the dial indicator 20 is moved to a predetermined or zero graduation.

Figure 4:
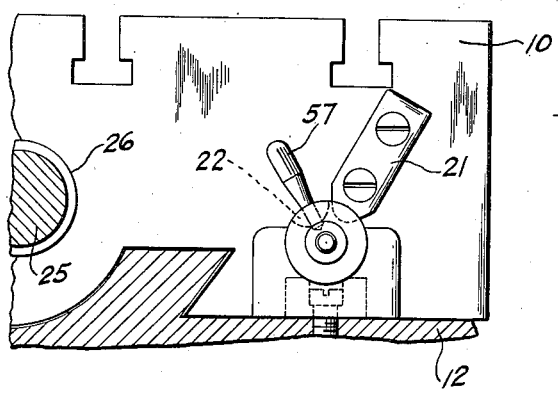
Fig. 4 is an elevation of a portion of the saddle and table showing an end view of the positioning bar or rod and the table abutment engageable therewith.

Within the saddle 12 and disposed in a direction parallel to the direction of movement of the table is the elongated bar or rod 15 preferably made up of individual sleeves 55 of a predetermined length between their end faces. This bar 15 may rest in a suitable bearing or groove in the saddle 12 so that the bar will be maintained parallel to the surface of the table 10 and to the direction of movement of the table. Disposed between the sleeves 55 on the bar 15 are the discs 16 of predetermined thickness and having carefully finished opposite faces. These discs 16 are held together by means of a rod 56 extending centrally therethrough whereby the assembled parts are retained in fixed position and form a complete built-up measuring bar or rod. The dimensions between corresponding faces of the discs 16 may for convenience be exactly an inch or an even two inches or any desired dimension to an extreme precision. As shown more clearly in Fig. 4, the discs 16 form projections along the bar or rod 15 and have an angular cut-out or notched portion 22. Preferably these cut-out portions on the projections 16 are in alinement with each other so that abutment 21 depending from the table 10 may in one position of the bar 15 pass each of the projections 16 but in another position of the bar the abutment may be brought into contact with the side face of any one of the discs or projections. In order to oscillate the bar or rod 15 about its axis to its operative and inoperative positions a handle 57 may be provided on or adjacent an end portion for manual operation during the set-up operation.

In operation to move the table 10 a predetermined distance from one position to another the micrometer anvil 42 will be adjusted by its screw 43 and the rod 15 will be oscillated to permit the abutment 21 to pass the projections 16. The table will then be advanced to approximately the desired position by screw 25 rotated by handle 27.

The bar or rod 15 is then turned to its operative or abutment engaging position and the table 10 is slowly adjusted until the abutment 21 engages a side surface of one of the desired projections 16. Movement of the table 10 is then continued by the slow motion device by rotating knob 30 referred to above until the pointer 52 of the dial indicator 20 is in its zero indicating position. In this position the table will have been adjusted to the desired position.

What we claim is:

1. A table positioning device for machine tools comprising in combination, a support, a table movable horizontally thereon, a bar slidably mounted for limited movement in said support in a direction parallel to the direction of movement of said table, indicating means on said support to determine the axial position of said bar thereon, spaced projections on said bar, and a fixed abutment on said table, said bar being oscillatable about its axis to angularly different positions to engage a projection with said abutment and to permit said abutment to pass said projections when said table is moved on said support.

2. A table positioning device for machine tools comprising in combination, a support, a table movable horizontally thereon, a bar slidably mounted for limited movement within the support and disposed parallelly to the direction of movement of said table, a micrometer mounted on said support and having its anvil adapted to contact against the end of said bar or rod for determining the axial position of said bar, a dial indicator adapted to contact with one end of said micrometer whereby the axial position of said bar may be determined, spaced projections on said bar, a fixed abutment on said table movable into contact with any one of said projections when said table is adjusted, and means to oscillate said bar about its axis whereby said abutment may pass said projections when said table is adjusted.

3. A positioning device for a movable work carrying table, a support for said table, a micrometer mounted therein, a bar on said support having projections thereon, said bar contacting at one end with the end of said micrometer and movable predetermined distances thereby, supporting means in said support for said micrometer permitting limited axial movement of its spindle within said support, a dial indicator mounted in said support and having its gaging member in contact with said micrometer spindle, and an abutment on said table adapted to contact with any one of said projections on said bar when said table is in adjusted position and adapted to force said micrometer spindle and gaging member of said indicator axially, said bar being oscillatable about its axis to angularly different positions to engage a projection with said abutment in one angular position and to permit said abutment to pass said projections in another angular position when said table is moved on said support.

4. A positioning device for a movable work supporting table comprising in combination, a support, a table movable horizontally thereon, a micrometer mounted in said support for limited axial movement of its spindle therein, a bar engaging said micrometer and moved thereby, a plurality of projections on said bar having recesses formed therein, an abutment on said table adapted to engage any one of said projections on said rod, said rod being oscillatable about its axis to permit movement of said table and abutment past said projections, and a dial indicator having its gaging member in contact with said micrometer spindle to determine when said table is in predetermined adjusted position.

JOHN M. RUSNAK.
GEORGE H. HOCHMUTH.